(12) United States Patent
Karube et al.

(10) Patent No.: US 6,538,231 B2
(45) Date of Patent: Mar. 25, 2003

(54) LASER MACHINING APPARATUS (75) Inventors: Norio Karube, Machida (JP); Atsushi Watanabe, Tokyo (JP); Nobuaki Iehisa, Mishima (JP); Akihiro Terada, Fujiyoshida (JP); Mitsuhiro Okuda, Yamanashi (JP)

(73) Assignee: Fanuc, Ltd., Yamanashi (JP)

( * ) Notice: Subject to any disclaimer, the term of this patent is extended or adjusted under 35 U.S.C. 154(b) by 0 days.

(21) Appl. No.: 09/813,025

(22) Filed: Mar. 21, 2001

(65) Prior Publication Data

US 2001/0023861 A1 Sep. 27, 2001

(30) Foreign Application Priority Data

Mar. 23, 2000  (JP) ........................................ 2000-082377

(51) Int. Cl.[7] ........................ B23K 26/06; B23K 26/36; B23K 26/20
(52) U.S. Cl. .................................. 219/121.76; 372/109
(58) Field of Search ........................ 219/121.76, 121.77; 372/33, 34, 109

(56) References Cited

U.S. PATENT DOCUMENTS

| | | | | |
|---|---|---|---|---|
| 4,697,269 A | * | 9/1987 | Ohara ........................... | 372/34 |
| 4,820,899 A | * | 4/1989 | Hikima et al. .......... | 219/121.76 |
| 4,977,566 A | * | 12/1990 | Herbst et al. ................. | 372/33 |
| 5,064,991 A | | 11/1991 | Alborante ............... | 219/121.63 |
| 5,495,490 A | * | 2/1996 | Rice et al. .................... | 372/34 |
| 5,589,089 A | * | 12/1996 | Uesugi | |
| 6,127,647 A | * | 10/2000 | Matsuo et al. ......... | 219/121.76 |
| 6,201,211 B1 | * | 3/2001 | Emmelmann .......... | 219/121.76 |
| 6,299,429 B1 | * | 10/2001 | Xuan ..................... | 219/121.77 |
| 2001/0015990 A1 | * | 8/2001 | Miyai et al. | |
| 2002/0000426 A1 | * | 1/2002 | Mead et al. ............ | 219/121.76 |

FOREIGN PATENT DOCUMENTS

| | | | |
|---|---|---|---|
| DE | 4234342 A1 | * | 4/1994 |
| JP | 4-238689 | | 8/1992 |

* cited by examiner

*Primary Examiner*—Geoffrey S. Evans
(74) *Attorney, Agent, or Firm*—Staas & Halsey LLP (57) ABSTRACT

A plurality of laser generators are provided to be environmentally separated from a machining station, and temperature, humidity, vibration, cleanliness and the like are detected by a sensor, and displayed. When an abnormal environment is detected, machining operation is stopped immediately or after a predetermined time elapsed. The laser generators are grouped according to each machining tool, and fiber-optic cable switching devices FC3 and FC4 are arranged for each group. By the switchover of the laser generator, and the selective connection of a fiber-optic cable by using the fiber-optic cable switching device, the degree of freedom in selecting the laser generator and the fiber-optic cable is produced. The degree of freedom is utilized according to the abnormality of the laser generator, the abnormality of the fiber-optic cable, the type of machining work, and the like, by which a machining apparatus in which the occurrence of a partial failure does not lead to long-term shutdown of a manufacturing line can be obtained.

16 Claims, 7 Drawing Sheets

LASER MACHINING APPARATUS

BACKGROUND OF THE INVENTION

1. Field of the Invention

The present invention relates to a laser machining apparatus for performing laser machining of welding, cutting, etc. by applying a laser beam on a workpiece from a machining tool, which is suitable for use in a motor vehicle manufacturing line.

2. Description of Related Art

Recently, the laser welding using a YAG laser as an optical energy supply source has increasingly been adopted especially on a motor vehicle manufacturing line. The reason for this is that the laser welding has an advantage of achieving high rigidity and lightweight easily in terms of vehicle body design over the spot welding.

Regarding the positioning of a machining tool that applies a laser beam on a workpiece, the use of a special positioning device and a robot capable of programing a travel path has already been proposed. Also, an example in which a line configuration such that a plurality of laser generators are prepared, and laser beams are supplied to a plurality of locations where welding is performed is considered (Japanese Patent Laid-Open Publication No. 4-238689) has been reported.

A problem associated with such laser welding and laser cutting is that in case of failure or damage to the laser generator or a fiber-optic cable used for optical transmission from the laser generator to the machining tool, even if a part thereof fails or is damaged, the manufacturing line must be stopped for a long period of time, resulting in a decrease in the rate of operation of the line.

For example, in the case where three laser generators are prepared and a laser beam is supplied from each of the laser generators to each of three machining tools to perform automatic welding at three places, in the present situation, even if any trouble occurs in one of the laser generators or one (one system) fiber-optic cable, all welding operations at three places (systems) have to be stopped to repair the system.

SUMMARY OF THE INVENTION

An object of the present invention is to avoid long-term shutdown of a machining operation and thereby increase a rate of operation even when any trouble such as failure and damage occurs partially in a system constituting a machining apparatus. Another object of the present invention is to effect an environmental separation for a laser generator liable to be affected by an harsh environment of a place where machining is done, and thereby to assist the improvement in the rate of operation from the viewpoint of environment.

In the laser beam machining apparatus in accordance with the present invention, a plurality of laser generators are arranged, one or more machining tools and machining tool moving means for supporting the machining tool are provided, and each machining tool is associated with two or more of the laser generators to form a group.

According to a first aspect of the present invention, for each group, a plurality of fiber-optic cable switching devices are provided between the laser generators and the machining tool in the group, and each of the laser generators is connected to one of the fiber-optic cable switching devices via a fiber-optic cable. Further, a connection between the fiber-optic cable switching devices and a connection between the fiber-optic cable switching device and the machining tool are made by one or more fiber-optic cables. By issuing a switchover command to the fiber-optic cable switching device, the laser generator for use and the fiber-optic cable for guiding a laser beam to the machining tool can be changed over.

Also, according to a second aspect of the present invention, one or more fiber-optic cable switching devices are arranged along a laser beam transmission path between the laser generators and the machining tool in each group. All of the laser generators in the group are connected to one fiber-optic cable switching device arranged most upstream in the laser beam transmission path, and a connection between the fiber-optic cable switching devices and a connection between the fiber-optic cable switching device and the machining tool are made by one or more fiber-optic cables. By issuing a switchover command to the fiber-optic cable switching device, the laser generator for used and the fiber-optic cable for guiding a laser beam to the machining tool can be changed over.

In the arrangements according to the first or second aspect, it is preferable that when a trouble occurs in the laser generator, a switchover command is issued to the fiber-optic cable switching device so that the fiber-optic cable connected with the laser generator in trouble is switched to the fiber-optic cable connected with another laser generator, thereby the laser generator for use is changed over.

Likewise, in the arrangements according to the first or second aspect, it is preferable that a fiber-optic cable in trouble is switched to another fiber-optic cable in the plurality of fiber optic cables for connecting the fiber-optic cable switching device to the machining tool by a switchover command issued to the fiber-optic cable switching device.

Also, it is preferable that one of the fiber-optic cables which are respectively connected with the laser generators is selected in accordance with cutting or welding to be performed by the machining tool by a switchover command issued to the fiber-optic cable switching device.

Further, the laser generators may be arranged in an environment where at least one of temperature, humidity, cleanness and vibration is controlled and the environment of a location where the laser generators are arranged may be separated form an environment in the other locations including a location where one or more machining tools and the machining tool moving means are arranged, to thereby prevent undesirable influence on the laser generators from the environment of the other locations.

In this case, it is preferable that the separation of the environment of the location where said plurality of laser generators are arranged from the environment of the other location is performed by a separation means surrounding at least a part of the laser generators, and the separation means is formed of a laser-beam untransparent material.

Also, it is preferable to provide a detector for detecting at least one environmental factor of temperature, humidity, cleanness and vibration in the separated environment of the laser generators, and a display device for displaying a level of the environmental factor detected by the detector.

In this case, the laser machining may be stopped immediately or after elapsing a predetermined time when the detected level deviates form a predetermined range, and information regarding a cause of the stoppage of the laser machining may be displayed by the display device. It is preferable that the predetermined time is adjustable.

DETAILED DESCRIPTION OF THE PREFERRED EMBODIMENTS

Figure 1:
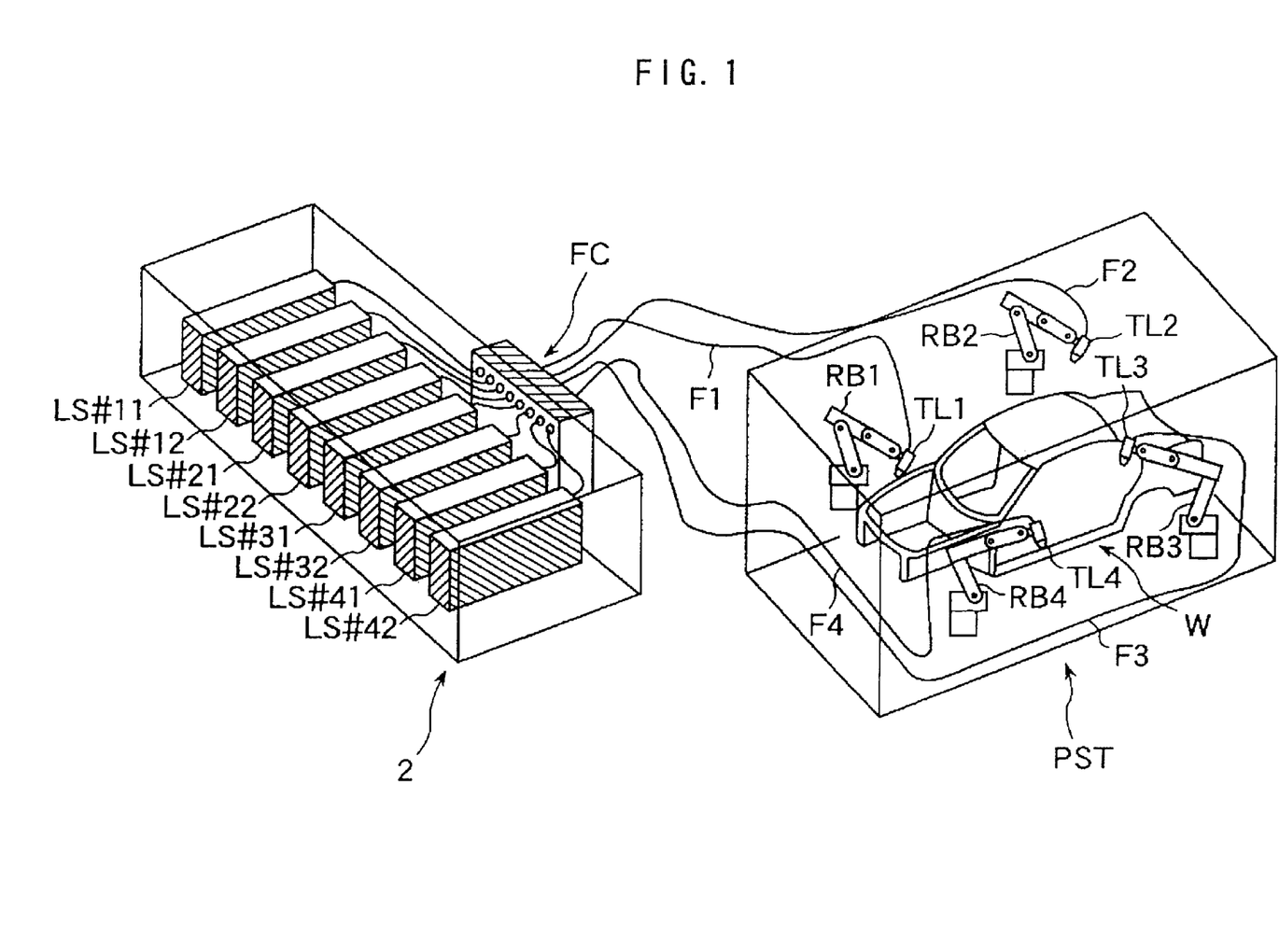
FIG. 1 is a schematic view showing one embodiment of the present invention.

FIG. 1 is a schematic view for explaining one embodiment of the present invention. As shown in FIG. 1, a laser beam machining apparatus of this embodiment includes eight laser generators LS#11 to LS#42, four machining tools TL1 to TL4 for performing a machining operation by receiving a laser beam, robots RB1 to RB4 to which each of the machining tools is attached, and a fiber-optic cable switching device FC. As the laser generator, what is called a YAG laser oscillator is used, and in some cases, another type of YAG laser oscillator can be used.

The robots RB1 to RB4 are ordinary ones that are controlled by a robot controller (not shown in FIG. 1, see FIG. 6 described later) connected to each of the robots. Each of the robots moves the machining tool TL1 to TL4 along a desired path in accordance with a machining program taught to each robot. The machining program data includes not only a command for movement but also commands for start and end of machining, the specification and change of type of machining operation, etc. and related parameters.

The machining tool TL1 to TL4 performs machining operation using a laser beam at required machining locations on a workpiece W. The types of machining work include welding, cutting, and so on. The workpiece W is typically a vehicle body positioned on a manufacturing line. It is a matter of course that another workpiece W is machined according to the application.

The machining tools TL1 to TL4 and the robots RB1 to RB4, which are moving means therefor, are arranged around the workpiece W. The place where these elements are arranged is hereafter referred to as a machining station PST.

On the other hand, the laser generators LS#11 to LS#42, which are supply sources for supplying laser beams to the machining tools TL1 to TL4, are disposed in a laser station 2 separate from the machining station PST. To transmit laser beams from the laser generators LS#11 to LS#42 disposed in the laser station 2 to the machining tools TL1 to TL4 for performing machining work in the machining station PST, fiber-optic cables F1 to F4 are used.

A basic feature of the present invention is that the plural laser generators LS#11 to LS#42 and one or more machining tools TL1 to TL4 are grouped in accordance with a preset corresponding relationship, and in each group, the laser generators or the fiber-optic cables or both of them can be switched over. To switch over the fiber-optic cables, the machining apparatus in accordance with the present invention has at least one fiber-optic cable switching device FC.

Also, as the laser generators LS#11 to LS#42, those that can monitor the output conditions of their output beams are used. If a monitor detects a trouble (for example, no lighting or decrease in oscillation level), the detection result is immediately sent to a line centralized control board (described later). Various techniques for monitoring (abnormality detection) of the laser generator are publicly known, so that the detailed explanation thereof is omitted.

In the example shown in FIG. 1, one fiber-optic cable F1 to F4 is provided to supply a laser beam to each of the machining tools TL1 to TL4. The output end of each of the fiber-optic cables F1 to F4 is connected to a light gathering portion of each of the machining tools TL1 to TL4, and the input end thereof is connected to an output terminal of the fiber-optic cable switching device FC additionally provided on the laser station 2. The fiber-optic cable switching device FC may be provided within the laser station 2.

On the other hand, the outputs of the eight laser generators LS#11 to LS#42 each are connected to input terminals of the fiber-optic cable switching device FC by using a short fiber-optic cable or the like. Here, it should be noted that the eight laser generators LS#11 to LS#42 are grouped into four groups G1 to G4. The group G1 is a group relating to the supply of a laser beam to the machining tool TL1 through the fiber-optic cable F1. In this example, the laser generators LS#11 and LS#12 belong to the group G1.

Likewise, the laser generators LS#21 and LS#22 form the group G2 so as to correspond to the machining tool TL2, the laser generators LS#31 and LS#32 form the group G3 so as to correspond to the machining tool TL3, and the laser generators LS#41 and LS#42 form the group G4 so as to correspond to the machining tool TL4.

For example, at the start time of machining at the initial stage of operation, the outputs of the laser generators LS#11, LS#21, LS#31, and LS#41 each are transferred to the fiber-optic cables F1, F2, F3, and F4 in the fiber-optic cable switching device FC, and are sent to the machining tools TL1, TL2, TL3, and TL4. If a trouble occurs in any one of the laser generators LS#11, LS#21, LS#31, and LS#41 in a process of prolonged operation time, the switchover of the laser generator is effected in the group to which the laser generator in which the trouble has occurred belongs, and accordingly the switchover of the fiber-optic cable (switchover of the fiber-optic cable connecting the laser generator to the fiber-optic cable switching device) is effected.

For example, when a trouble occurs in the laser generator LS#31, the laser generator LS#32 is turned on in place of the laser generator LS#31. At the same time, in the fiber-optic cable switching device FC, the short fiber-optic cable that receives the output of the laser generator LS#32 is switched over so as to be optically coupled to the fiber-optic cable F3.

The number of laser generators provided in one group may be three or more. For example, four laser generators LS#n1, LS#n2, LS#n3, and LS#n4 may be provided in each group n (N=1, 2, ... N; N is a total number of groups). Also, a subgroup may be formed in the same group so as to relate to the rule of switchover. For example, the laser generators LS#n1 and LS#n2 are assigned to welding, and the laser generators LS#n3 and LS#n4 are assigned to cutting, by which the laser generators may be used properly according to the type of machining work.

For example, if a trouble occurs in the laser generator LS#n1 when welding is being performed by using the laser generator LS#n1, the laser generator LS#n1 is switched over to the laser generator LS#n2. When the type of machining work is changed from welding to cutting, the laser generator LS#n1 is switched over to the laser generator LS#n3. Further, if a trouble occurs in the laser generator LS#n3, the laser generator LS#n3 is switched over to the laser generator LS#n4. Such switchover is executed by a switchover command sent from the line centralized control board as described later.

The configuration may be such that the similar switchover is effected when the fiber-optic cable connecting each of the laser generators LS#11 to LS#42 to the fiber-optic cable switching device FC is damaged. In this case, for example, in the fiber-optic cable switching device FC, there is provided a photo-detector (damage detector) for checking whether the output beam of each of the laser generators LS#11 to LS#42 has reached the fiber-optic cable switching device FC properly.

Figure 2:
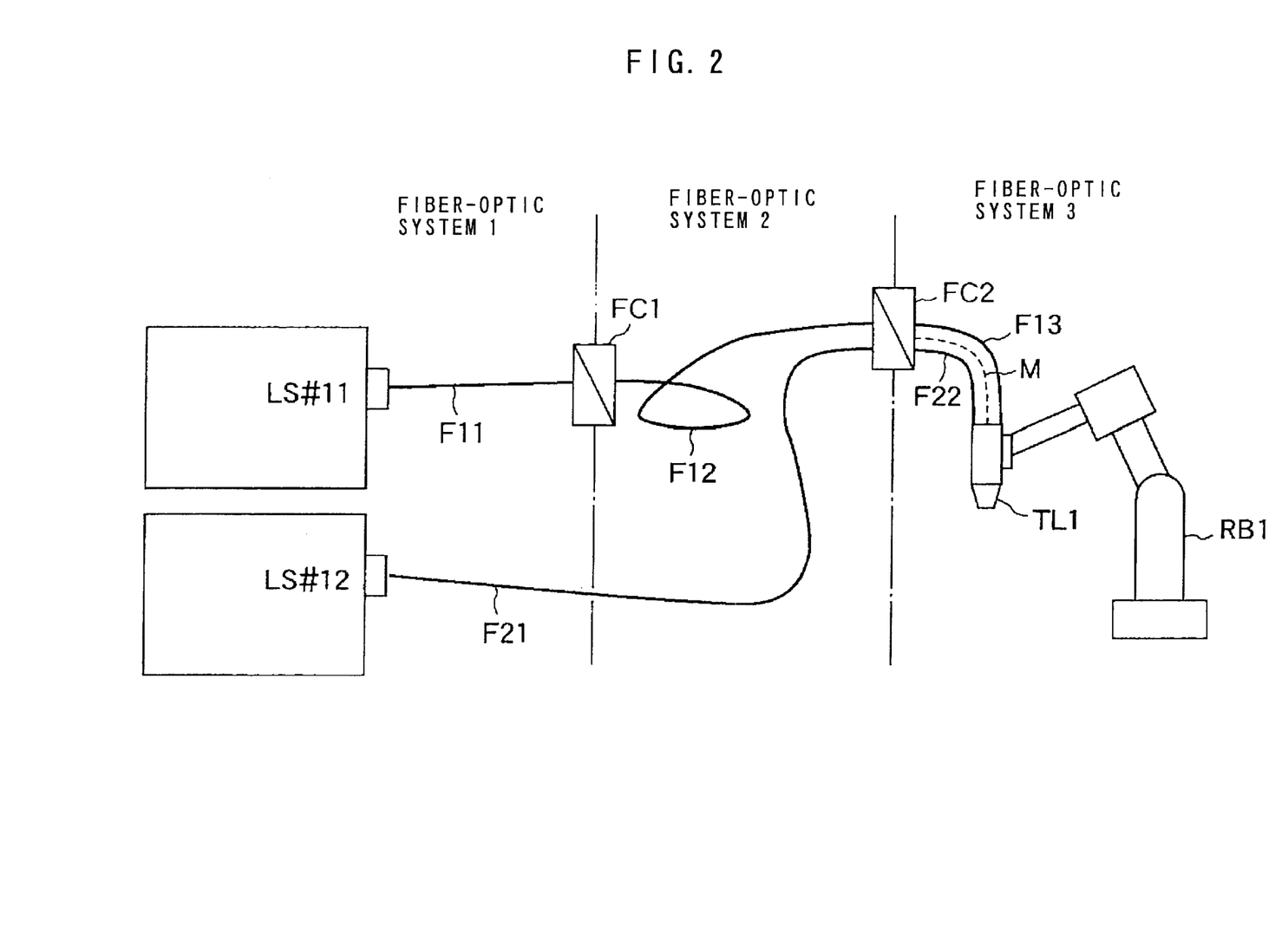
FIG. 2 is a schematic view of one example of a mode in which a plurality of fiber-optic cable switching devices are provided in one group.
Figure 3:
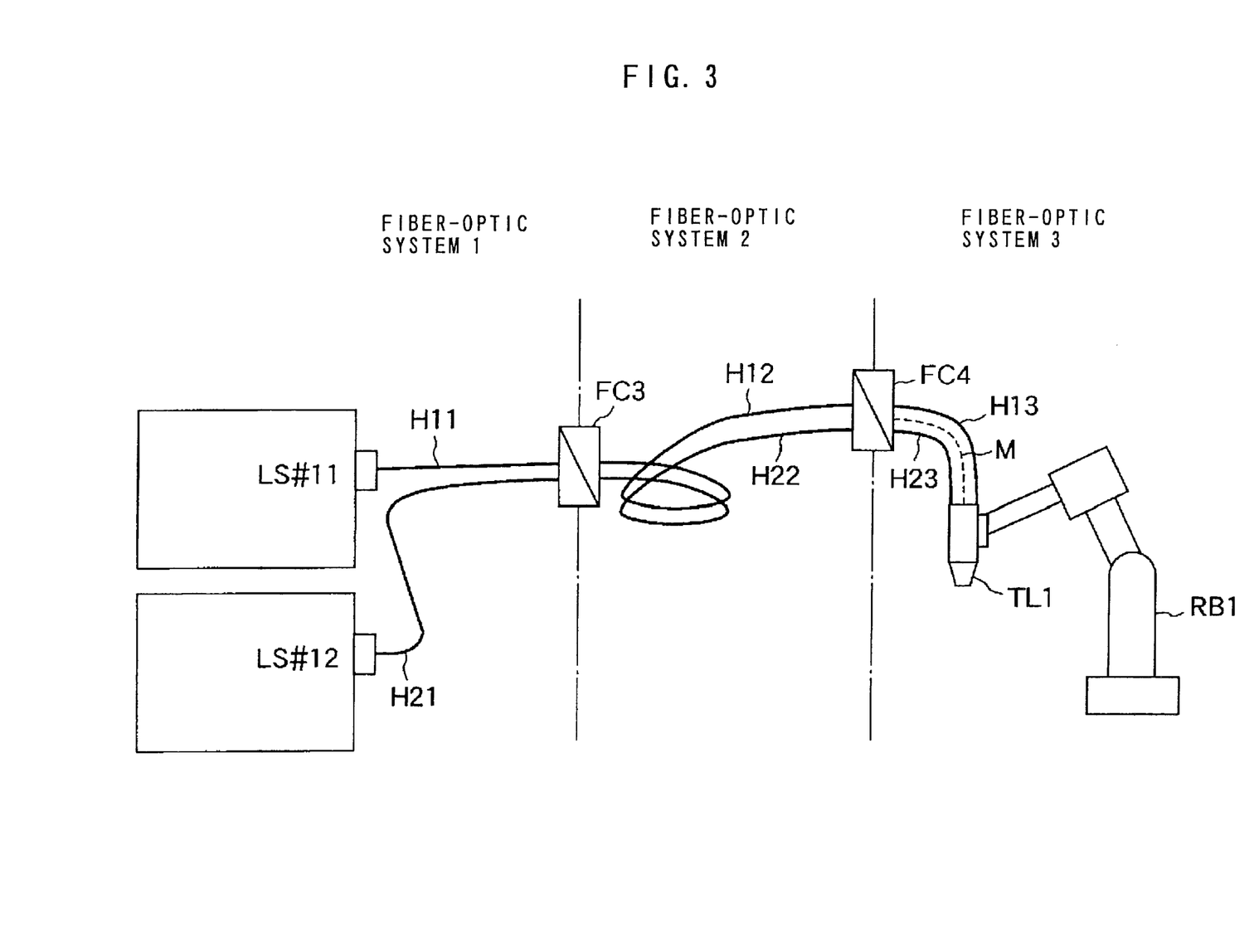
FIG. 3 is a schematic view of another example of a mode in which a plurality of fiber-optic cable switching devices are provided in one group.

Also, a mode in which a plurality of fiber-optic cable switching devices are provided in one group can also be used. Examples of such modes are shown in FIGS. 2 and 3. These figures typically show the arrangement of a group 1, and for other groups 2 to 4, the same arrangement is used.

In the example shown in FIG. 2, for one group, two fiber-optic cable switching devices FC1 and FC2 are arranged along the transmission path of laser beam. The laser generator LS#11 is connected to the fiber-optic cable switching device FC1 via a fiber-optic cable F11, and the laser generator LS#12 is connected to the fiber-optic cable switching device FC2 via a fiber-optic cable F21. Also, the fiber-optic cable switching devices FC1 and FC2 are connected to each other via a fiber-optic cable F12, and the fiber-optic cable switching device FC2 and the machining tool TL1 are connected to each other via fiber-optic cables F13 and F22. The fiber-optic cable switching device FC1 turns on (connection)/off (disconnection) the connection of the fiber-optic cables F11 and F12. Also, the fiber-optic cable switching device FC2 selectively connects one of the fiber-optic cables F12 and F21 to one of the fiber-optic cables F13 and F22. Four types of optical paths of F12→F13, F12→F22, F21→F13, and F21→F22 are possible.

Sequences of selection of optical paths by switchover in one group are, for example, as follows:

(1) At the time when machining is started at the initial stage of operation: Laser generator LS#11→fiber-optic cable F11→switching device FC1→fiber-optic cable F12→switching device FC2→fiber-optic cable F13→machining tool TL1

(2A) At the time when a trouble occurs in the fiber-optic cable F11 or F12 during the normal operation of the laser generator LS#11: Laser generator LS#12 (laser generator LS#11 is turned off)→fiber-optic cable F21 (switching device FC1 is shut off)→switching device FC2→fiber-optic cable F13→machining tool TL1

(2B) At the time when a trouble occurs in the fiber-optic cable F13 during the normal operation of the laser generator LS#11: Laser generator LS#11→fiber-optic cable F11→switching device FC1→fiber-optic cable F12→switching device FC2→fiber-optic cable F22→machining tool TL1

(3) At the time when a trouble occurs in the laser generator LS#11 in the state of the above item (1): Laser generator LS#12→fiber-optic cable F21 (fiber-optic cable switching device FC1 is shut off)→fiber-optic cable switching device FC2→fiber-optic cable F13→machining tool TL1

(4) At the time when a trouble occurs in the fiber-optic cable F13 in the state of the above item (3): Laser generator LS#12→fiber-optic cable F21→switching device FC2→fiber-optic cable F22→machining tool TL1

As described above, even if a trouble occurs at a part of the laser generator or the fiber-optic cable path, the operation can be continued by switching over the laser generator and/or the fiber-optic cable. The maintenance such as replacement of a defective part can be accomplished at a convenient time, for example, after one-lot work has been finished.

As described above, a trouble occurring in the laser generator is detected by the monitor mounted in the laser generator itself. Also, to detect a trouble (damage) of the fiber-optic cables F11, F12, F13, F21, and F22, various publicly known techniques can be used. For example, there is available a method in which a fiber-optic cable for monitoring as indicated by the broken line M is additionally provided, and the return of reflected light of the output of the machining tool TL1 is monitored by a photo-detector provided in the fiber-optic cable switching device FC2.

In this case, the judgment of damaged fiber is made as described below. It is to be noted that the laser generator in use is assumed to be trouble-free. If a trouble occurs in the laser generator, switchover of the laser generator is preferentially effected as described above. It is assumed that a trouble (damage) occurs in any one of the fiber-optic cables in use (one to three of the fiber-optic cables F11, F12, F13, F21, and F22) during the normal operation of the laser generator. Then, the optical output of the machining tool TL1 decreases abnormally (including a case where the output is zero), and accordingly the normal level of the optical path M for return light is not detected. The subsequent sequences are as follows:

(1) In the case where the laser generator LS#11 is in use (normally operated):

1A: The connection on the output side of the fiber switching device FC2 is switched over. For example, if the fiber-optic cable F13 is in use, the fiber-optic cable is switched over to F22. Inversely, if the fiber-optic cable F22 is in use, the fiber-optic cable is switched over to F13. If the detection level of M is restored to the normal level by this switchover, it is found that the fiber-optic cable F13 or F22 before the switchover has been damaged.

1B: If the detection level of the optical path M for return light is not restored to the normal level by the switchover of connection on the output side of the fiber switching device FC4, the fiber-optic cable F11 or F12 is damaged. In this case, in order to further judge which of the fiber-optic cables F11 and F12 is damaged, a photo-detector for checking whether the output beam of the laser generator LS#11 has reached the switching device FC1 has only to be provided additionally in the fiber-optic cable switching device FC1. If the output beam has reached the switching device FC1, the downstream-side fiber F12 is damaged. If not, the upstream-side fiber F11 is damaged.

(2) In the case where the laser generator LS#12 is in use (normally operated):

2A: The connection on the output side of the fiber switching device FC2 is switched over. For example, if the fiber-optic cable F13 is in use, the fiber-optic cable is switched over to F22. Inversely, if the fiber-optic cable F22 is in use, the fiber-optic cable is switched over to F13. If the detection level of M is restored to the normal level by this switchover, it is found that the fiber-optic cable F13 or F22 before the switchover has been damaged.

2B: If the detection level of the optical path M is not restored to the normal level by the switchover of connection on the output side of the fiber switching device FC2, the fiber-optic cable F21 is damaged.

It is preferable that the fiber-optic cable damage location identified in this manner be displayed on an appropriate display unit (for example, a display unit attached to the line centralized control board) as described later.

Next, in the example shown in FIG. 3, for one group, two fiber-optic cable switching devices FC3 and FC4 are arranged along the transmission path of laser beam. The laser generator LS#11 is connected to the fiber-optic cable switching device FC3 via a fiber-optic cable H11, and the laser generator LS#12 is connected to the fiber-optic cable switching device FC3 via a fiber-optic cable H21. Also, the fiber-optic cable switching devices FC3 and FC4 are connected to each other via a fiber-optic cables H12 and H22. Further, the fiber-optic cable switching device FC4 and the machining tool TL1 are connected to each other via fiber-optic cables H13 and H23.

The fiber-optic cable switching device FC3 selectively connects one of the fiber-optic cables H11 and H12 to one of the fiber-optic cables H12 and H22. Likewise, the fiber-optic cable switching device FC4 selectively connects one of the fiber-optic cables H12 and H22 to one of the fiber-optic cables H31 and H32.

Sequences of selection of optical paths by switchover in one group are, for example, as follows:

(1) At the time when machining is started at the initial stage of operation: Laser generator LS#11→fiber-optic cable H11→switching device FC3→fiber-optic cable H12→switching device FC4→fiber-optic cable H13→machining tool TL1

(2A) At the time when a trouble occurs in the fiber-optic cable H11 during the normal operation of the laser generator LS#11: Laser generator LS#12→fiber-optic cable H21→switching device FC3→fiber-optic cable H12→switching device FC4→fiber-optic cable H13→machining tool TL1

(2B) At the time when a trouble occurs in the fiber-optic cable H12 in the state of the above item (2A): Laser generator LS#12→fiber-optic cable H21→switching device FC3→fiber-optic cable H22→switching device FC4→fiber-optic cable H13→machining tool TL1

(2C) At the time when a trouble occurs in the fiber-optic cable H13 during the normal operation of the laser generator LS#11: Laser generator LS#11→fiber-optic cable H11→switching device FC3→fiber-optic cable H12→switching device FC4→fiber-optic cable H23→machining tool TL1

(3) At the time when a trouble occurs in the laser generator LS#11 in the state of the above item (1): Laser generator LS#12→fiber-optic cable H21→fiber-optic cable switching device FC3→fiber-optic cable H12→switching device FC4→fiber-optic cable H13→machining tool TL1

(4A) At the time when a trouble occurs in the fiber-optic cable H13 in the state of the above item (3): Laser generator LS#12→fiber-optic cable F21→switching device FC3→fiber-optic cable H12→switching device FC4→fiber-optic cable H23→machining tool TL1

(4B) At the time when a trouble occurs in the fiber-optic cable H12 in the state of the above item (3): Laser generator LS#12→fiber-optic cable H21→switching device FC3→fiber-optic cable H22→switching device FC4→fiber-optic cable H13→machining tool TL1

As described above, even if a trouble occurs at a part of the laser generator or the fiber-optic cable path, the operation can be continued by switching over the laser generator and/or the fiber-optic cable. The maintenance such as replacement of a defective part can be accomplished at a convenient time, for example, after one-lot work has been finished.

As described above, a trouble occurring in the laser generator is detected by the monitor mounted in the laser generator itself. Also, to detect a trouble (damage) of the fiber-optic cables H11, H12, H13, H21, H22, and H23, various publicly known techniques can be used. For example, there is available a method in which a fiber-optic cable for monitoring as indicated by the broken line M is additionally provided, and the return of reflected light of the output of the machining tool TL1 is monitored by a photo-detector provided in the fiber-optic cable switching device FC4.

In this case, the judgment of damaged fiber is made as described below. It is to be noted that the laser generator in use is assumed to be trouble-free. If a trouble occurs in the laser generator, a switchover of the laser generator is preferentially effected as described above. It is assumed that a trouble (damage) occurs in any one of the fiber-optic cables in use (one to three of the fiber-optic cables H11, H12, H13, H21, H22, and H23) during the normal operation of the laser generator. Then, the optical output of the machining tool TL1 decreases abnormally (including a case where the output is zero), and accordingly the normal level of the optical path M for return light is not detected. The subsequent sequences are as follows:

(1) In the case where the laser generator LS#11 is in use (normally operated):

1A: The connection on the output side of the fiber switching device FC4 is switched over. For example, if the fiber-optic cable H13 is in use, the fiber-optic cable is switched over to H23. Inversely, if the fiber-optic cable H32 is in use, the fiber-optic cable is switched over to H13. If the detection level of M is restored to the normal level by this switchover, it is found that the fiber-optic cable H13 or H23 before the switchover has been damaged.

1B: If the detection level of the optical path M is not restored to the normal level by the switchover of connection on the output side of the fiber switching device FC4, another location is damaged. In this case, in order to further judge which of the fiber-optic cables Hi 1 and H12 or fiber-optic cables H21 and H22 is damaged, a photo-detector for checking whether the output beam of the laser generator LS#11 has reached the switching device FC3 has only to be provided additionally in the fiber-optic cable switching device FC3. If the output beam of the laser generator LS#11 has reached the switching device FC3, the downstream-side fiber H12 or H22 is damaged. If not, the upstream-side fiber H11 is damaged.

(2) In the case where the laser generator LS#12 is in use (normally operated):

2A: The connection on the output side of the fiber switching device FC4 is switched over. For example, if the fiber-optic cable H13 is in use, the fiber-optic cable is switched over to H32. Inversely, if the fiber-optic cable H32 is in use, the fiber-optic cable is switched over to H13. If the detection level of M is restored to the normal level by this switchover, it is found that the fiber-optic cable H13 or H23 before the switchover has been damaged.

2B: If the detection level of the optical path M is not restored to the normal level by the switchover of connection on the output side of the fiber switching device FC4, any one of two fiber-optic cables being connected of the fiber-optic cables H12, H21, and H22 is damaged.

In this case, in order to further judge which of the fiber-optic cables is damaged, a photo-detector for checking whether the output beam of the laser generator LS#12 has reached the switching device FC3 has only to be provided additionally in the fiber-optic cable switching device FC3. If the output beam of the laser generator LS#12 has reached the switching device FC3, a fiber-optic cable being connected of the downstream-side fibers H12 and H22 is damaged. If not, the upstream-side fiber H21 is damaged.

It is preferable that the fiber-optic cable damage location identified in this manner be displayed on an appropriate display unit (for example, a display unit attached to the line centralized control board) as described later.

Figure 4A:
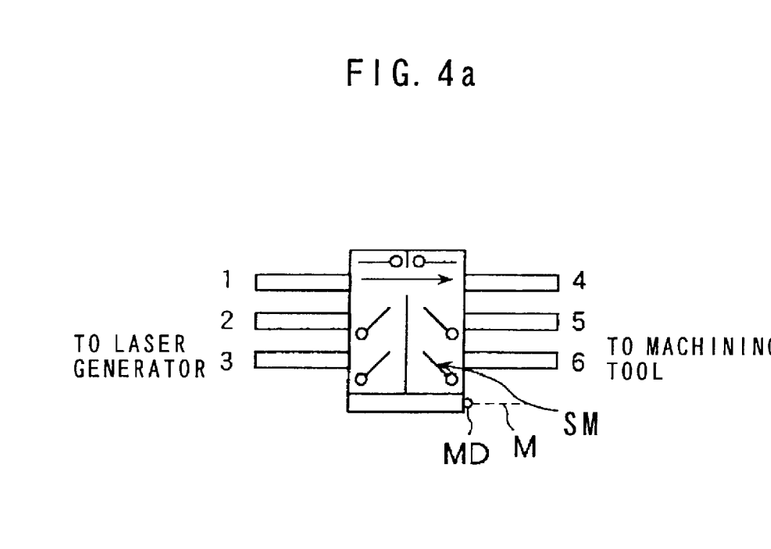
FIGS. 4a and 4b are schematic views showing different connection states of a switching mechanism for switching an optical path by a fiber-optic cable switching device.
Figure 4B:
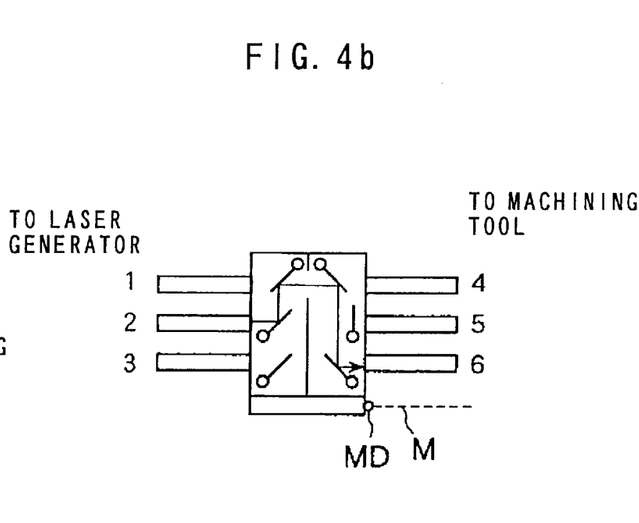

To switch over the optical path for the fiber-optic cable switching device FC, and FC1 to FC4 shown in FIGS. 1, 2 and 3, a mechanism shown in FIGS. 4a and 4b, for example, can be used. To drive a mirror, an air cylinder controlled by an electromagnetic valve, an electric motor, or the like is used. In the mechanism shown in the figures, three rotating mirrors are disposed on the input and output sides. By a combination of the positions of rotation of these mirrors, an arbitrary optical path of 1→4, 1→5, 1→6, 2→4, ..., 3→5, or 3→6 can be selected.

As two examples, an optical path of 1→4 is selected in the state shown in FIG. 4a, and an optical path of 2→6 is selected in the state shown in FIG. 4b. Reference character M denotes a fiber-optic cable for monitoring that transmits return light from the machining tool. The return output is detected by a detector MD for monitoring. The detection output of the detector MD for monitoring is sent to the line centralized control board, and is used to detect damage to the fiber-optic cable in the above-described manner.

As described before, the laser generator and the fiber-optic cable can be switched over according to the type of machining work. For example, in the example shown in FIG. 4, the fiber-optic cables 1, 2, 4 and 5 may be used for welding, and the fiber-optic cables 3 and 6, which are formed so as to have a small diameter, may be used for cutting. The laser generator may be switched over accordingly. The switchover of the optical path and the laser generator is executed by a switchover command sent from the line centralized control board.

Figure 5:
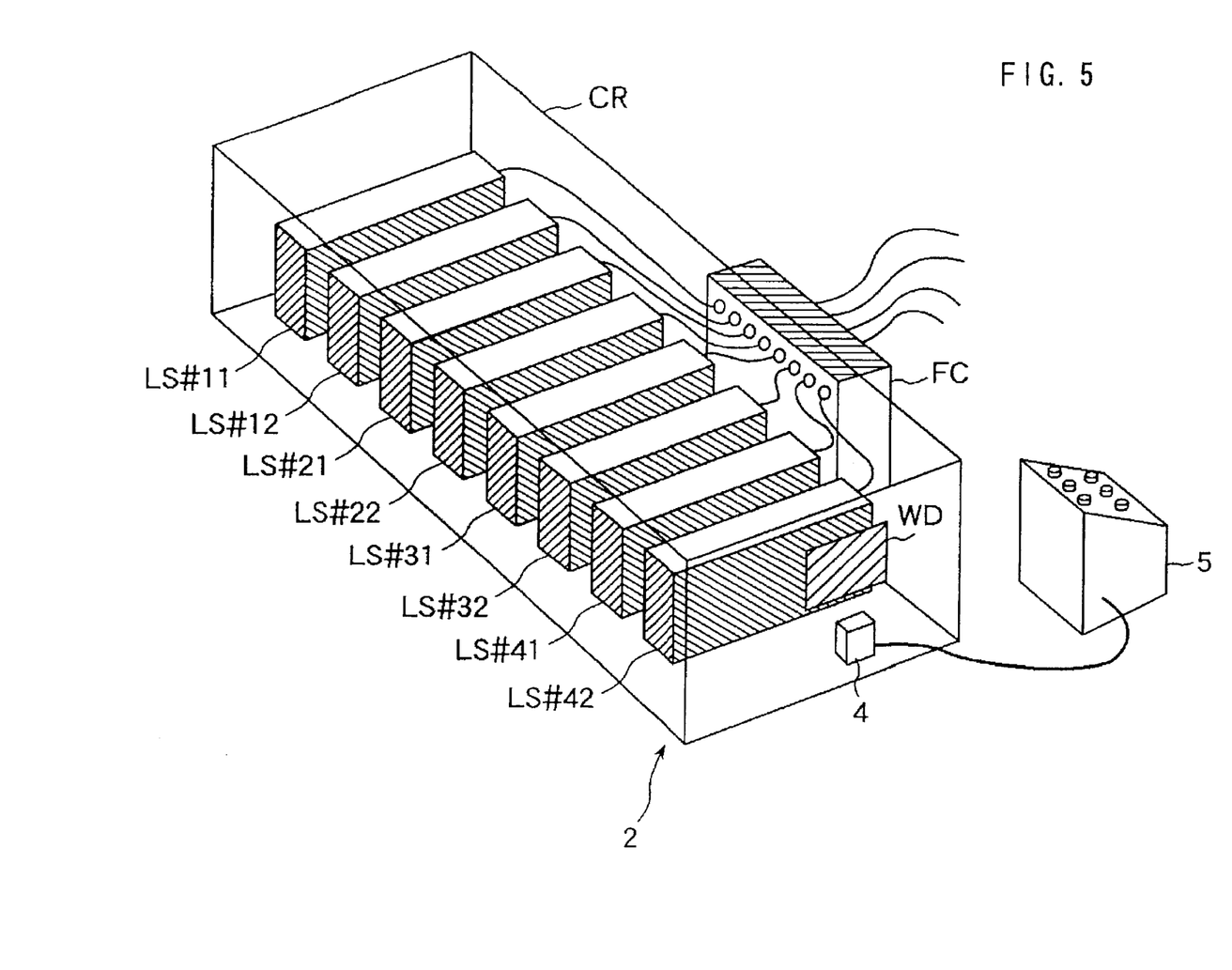
FIG. 5 is a schematic view of an example of a laser station.

Next, an example of the laser station provided with the laser generators, in which the degree of separation from the machining station is increased to carry out environment control, will be described with reference to FIG. 5. FIG. 5 shows one example of the laser station.

As shown in FIG. 5, the laser station 2 is made up of an isolated space CR and affiliated equipment. In the space CR, eight laser generators LS#11 to LS#42 and an environment sensor unit 4 are arranged. The environment sensor unit 4 is provided with various sensors for detecting vibration, temperature, humidity, and air cleanliness, attached circuits, and the like, and the outputs of the sensors are sent to an environment display panel 5 located at an appropriate position outside the space CR and the line centralized control board (not shown). The environment display panel 5 displays vibration, temperature, humidity, and air cleanliness by using numerical values, alarm lamps, or the like.

Also, if a level of vibration, temperature, humidity, or air cleanliness that hinders the continuation of work is detected, all of the laser generators are tuned off by the line centralized control board, by which machining work is stopped. In this case, however, the configuration may be such that machining work is not stopped immediately when a level meaning danger is detected, and after an appropriate preset time (for example, work time for one workpiece W) has elapsed, all of the laser generators are turned off to stop machining work.

Figure 6:
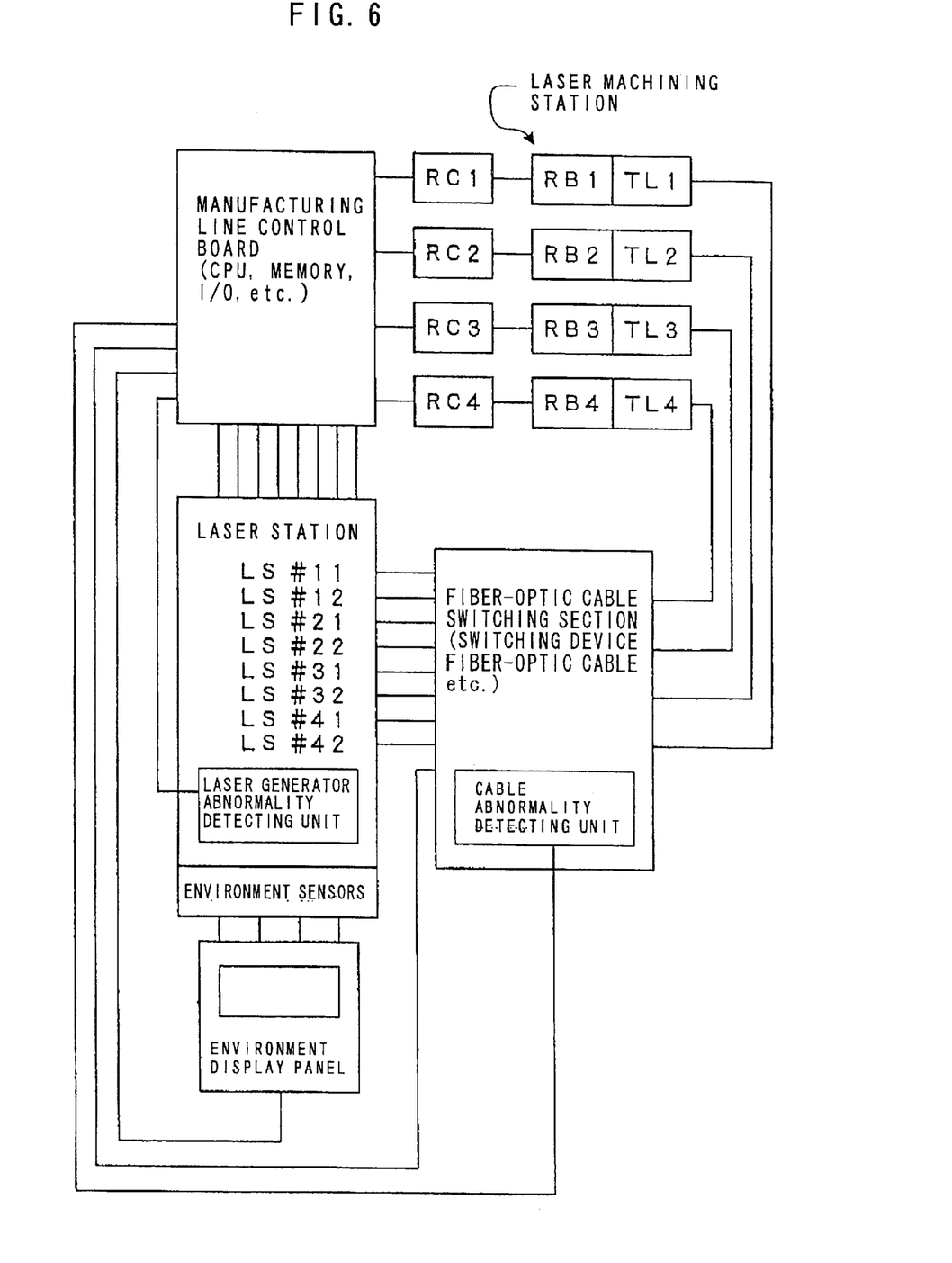
FIG. 6 is a block diagram showing a whole configuration of the system.

FIG. 6 shows an example of system configuration for effecting the switchover control described above, and FIG. 7 is a block diagram showing a processing flow.

In FIG. 6, reference numeral 1 denotes the line centralized control board, which has a CPU, a memory, an input-output device I/O for various outside signals, and the like. The memory stores program data for executing switching operation (switchover of the laser generator and/or the fiber-optic cable described before) performed in accordance with the flow shown in FIG. 7.

The line centralized control board 1 is first connected to the robot controllers RC1 to RC4 for controlling the robots RB1 to RB4. To each of the robot controllers RC1 to RC4 is taught machining program data including commands for specifying the start and stop of machining work and type of machining work (welding or cutting) while the machining tool TL1 to TL4 is moved along a predetermined path, and for specifying the switchover etc., and related parameters. Each machining program is activated by a command sent from the line centralized control board 1.

Next, the line centralized control board 1 is connected to the laser generators LS#11 to LS#42 in the laser station 2. Also, a laser abnormality detecting unit 21 for monitoring the laser output to detect abnormality is provided so as to be attached to each of the laser generators LS#11 to LS#42, and the output thereof is sent to the line centralized control board 1.

Further, in the laser station 2, the environment sensor unit 4 is provided, and the output thereof is sent to the line centralized control board 1 through the environment teaching panel 5.

The fiber-optic cable switching device 3 is interposed between the laser station 2 and the machining tool TL1 to TL4, and the configuration example thereof is as described before. A fiber-optic cable abnormality detecting unit 31 detects the return light (reflected light from the workpiece surface) from the machining tool TL1 to TL4 through a fiber-optic cable for monitoring as described before, and transmits the detection result to the line centralized control board 1.

The line centralized control board 1 identifies a fiber-optic cable damage location by the before-mentioned procedure, and displays the location on the display unit (not shown) attached to the line centralized control board 1.

Also, in parallel with this, a switchover command (specification of on/off for the laser generator) for switching over the laser generator and/or the fiber-optic cable by,the before-mentioned procedure is output to a necessary laser generator and/or fiber-optic cable switching device.

Figure 7:
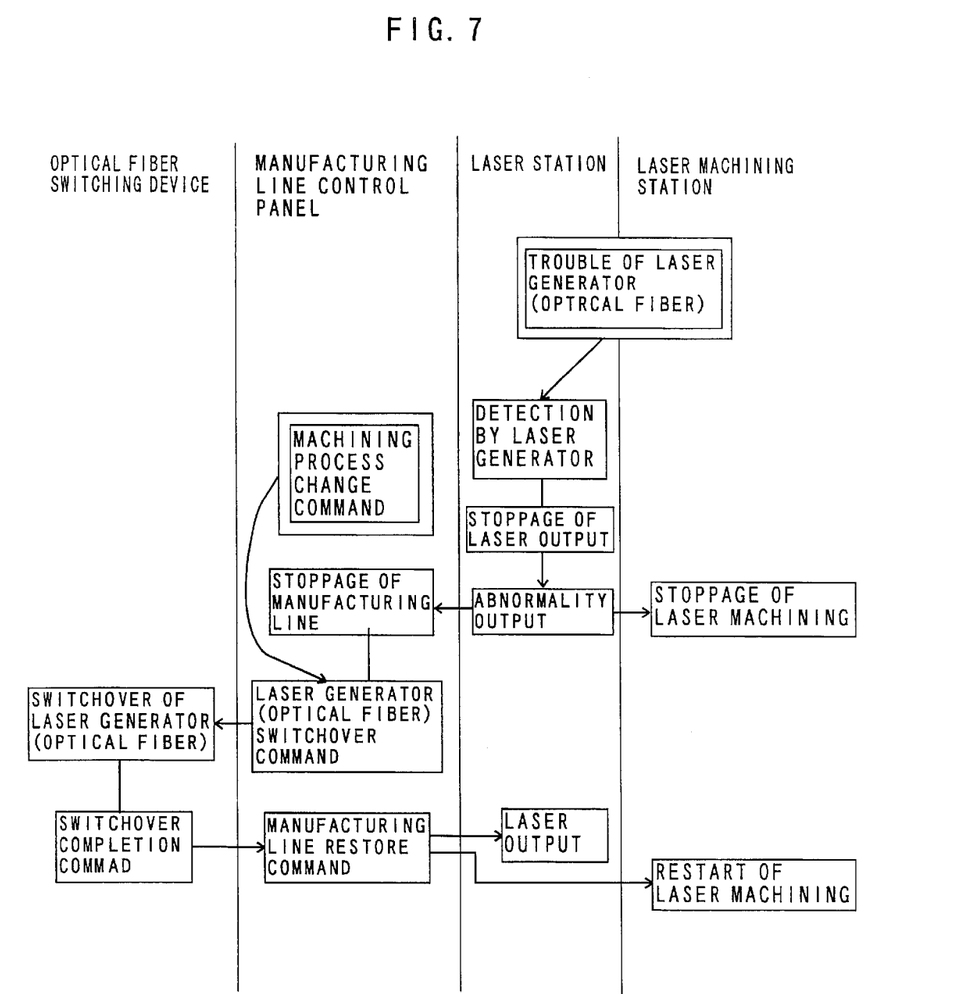
FIG. 7 is a block diagram showing an outline of a processing flow.

The block diagram of FIG. 7 shows the outline of the flow for switchover control after the start of machining. If a trouble occurs in any one of the laser generators after the start of machining, the trouble is detected by the laser generator itself, and the laser output of the laser generator is stopped. The result is sent to the line centralized control board 1 as an abnormal output, and the line is once stopped. In the machining station, the machining work is actually interrupted.

Next, the line centralized control board 1 determines a necessary switching operation by the before-mentioned procedure, and sends a switchover command to a necessary laser generator and/or fiber-optic cable switching device. Following a switchover completion command, a line restart command is issued, by which the line is restarted. In response to the switchover command, the laser generator is turned on, so that a laser beam is transmitted to the machining tool TL1 to TL4 through a selected fiber-optic cable path, by which in the machining station, machining work is actually restarted.

As mentioned before, the switchover of the laser generator and/or fiber-optic cable is executed by the same procedure not only when a trouble of the laser generator or damage to the fiber-optic cable occurs but also when a machining process change command is issued as the result of the switchover of type of machining work.

Also, processing when environmental abnormality occurs, which is separate from the flow shown in FIG. 7, is to stop the line by the issue of a line stop command without the switchover control of the laser generator and the fiber-optic cable. However, a standby time before the issue of the line stop command is preferably set so as to be variable. The standby time can be set, for example, by a manual input device of the line centralized control board 1.

According to the present invention, by the switchover of the laser generator, and the selective connection of the fiber-optic cable by using the fiber-optic cable switching device, the degree of freedom in selecting the laser generator and the fiber-optic cable is produced. Therefore, the degree of freedom is utilized according to the abnormality of the laser generator, the abnormality of the fiber-optic cable, the type of machining work, and the like, by which a machining apparatus in which the occurrence of a partial failure does not lead to long-term shutdown of the line can be obtained.

What is claimed is:

1. A laser machining apparatus comprising:
   a plurality of laser generators;
   one or more machining tools to focus a laser beam, each of said machining tools being associated with two or more of said plurality of laser generators to form a group;
   machining tool moving means for moving each of said machining tools along a desired machining path;
   fiber-optic cables for connecting said plurality of laser generators and said one or more machining tools;
   one or more fiber-optic cable switching devices provided between the laser generators and the machining tool in each group; and
   a control device to control said fiber-optic cable switching devices,
      wherein each of said laser generators is connected to one of said fiber-optic cable switching devices through the fiber-optic cable, the connection between the fiber-optic cable switching devices and the connection between the fiber-optic cable switching device and the machining tool are made through one or more fiber-optic cables, and said control device controls said fiber-optic cable switching device so as to change over the laser generator for use and the fiber-optic cables to guide a laser beam to the machining tool.

2. A laser machining apparatus according to claim 1, wherein said control device controls the fiber-optic cable switching device to switch the fiber-optic cable connected to a laser generator in trouble to the fiber-optic cable connected to another laser generator.

3. A laser machining apparatus according to claim 1, wherein said control device controls the optical path switching device to switch the fiber-optic cable in trouble to another fiber-optic cable in the plurality of fiber optic cables for connecting the fiber-optic cable switching device to the machining tool.

4. A laser machining apparatus according to claim 1, wherein said control device controls the fiber-optic cable switching devices to select one of the fiber-optic cables respectively connected with the laser generators in accordance with cutting or welding to be performed by said machining tool.

5. The laser machining apparatus according to claim 1, wherein the environment of a location where said plurality of laser generators are arranged is in an environment where at least one of temperature, humidity, cleanness and vibration is controlled and wherein the environment is separated from an environment in other locations including a location where said one or more machining tools and machining tool moving means are arranged.

6. A laser machining apparatus according to claim 5, wherein separation of the environment of the location where said plurality of laser generators are arranged from the environment of the other location is performed by a separation means for surrounding at least a part of said plurality of laser generators, said separation means being formed of a laser-beam untransparent material.

7. A laser machining apparatus according to claim 5, further comprising a detector for detecting at least one environmental factor of temperature, humidity, cleanness and vibration, and a display device for displaying a level of the environmental factor detected by said detector.

8. A laser machining apparatus according to claim 7, wherein a laser machining is stopped immediately or after elapsing a predetermined time when the detected level deviates form a predetermined range, and information regarding a cause of the stoppage of the laser machining is displayed by said display device.

9. A laser machining apparatus according to claim 8, wherein said predetermined time is adjustable.

10. A laser machining apparatus comprising:
    a plurality of laser generators;
    one or more machining tools to focus a laser beam, each of said machining tools being associated with two or more of said plurality of laser generators to form a group;
    machining tool moving means for moving each of said machining tools along a desired machining path;
    fiber-optic cables to connect said plurality of laser generators and said one or more machining tools;
    one or more fiber-optic cable switching devices arranged in a transmission path of the laser beam between the laser generators and the machining tool in each group; and
    a control device to control said fiber-optic cable switching devices,
       wherein all of said laser generators are connected to a fiber-optic cable switching device arranged most upstream in the transmission path of the laser beam through the fiber-optic cable, the connection between the fiber-optic cable switching devices and the connection between the fiber-optic cable switching device and the machining tool are made through one or more fiber optic cables,
       said control device controls said fiber-optic cable switching device so as to change over the laser generator for use and the fiber-optic cables to guide a laser beam to the machining tool.

11. A laser machining apparatus according to claim 10, wherein said control device controls the fiber-optic cable switching devices to switch the fiber-optic cable connected with a laser generator in trouble to the fiber-optic cable connected with another laser generator.

12. A laser machining apparatus according to claim 10, wherein said control device controls the fiber-optic cable switching devices to switch the fiber-optic cable connecting the fiber-optic cable switching device and the machining tool in trouble to another fiber-optic cable.

13. A laser machining apparatus according to claim 10, wherein said control device controls the fiber-optic cable switching devices to select a fiber-optic cable connected with a laser generator to the fiber-optic cable connected with another laser generator in accordance with cutting or welding to be performed by said machine tool.

14. The laser machining apparatus according to claim 10, wherein the environment of a location where said plurality of laser generators are arranged is in an environment where at least one of temperature, humidity, cleanness and vibration is controlled and wherein the environment is separated from an environment in other locations including a location where said one or more machining tools and machining tool moving means are arranged.

15. A laser machining apparatus according to claim 11, wherein separation of the environment of the location where said plurality of laser generators are arranged from the environment of the other location is performed by a separation means for surrounding at least a part of said plurality or laser generators, said separation means being formed of a laser-beam non-transparent material.

16. A laser machining apparatus comprising:

a plurality of laser generators to generate laser beams;

a plurality of machining tools to focus the generated laser beams;

a plurality of fiber-optic cable switching units; and a plurality of fiber optic cables, each fiber optic cable transporting the generated laser beams from one of the plurality of laser generators to one of the plurality of fiber-optic cable switching units, transporting the generated laser beams from one of the plurality of fiber-optic cable switching units to one of the plurality of machining tools and transporting the generated laser beams between two of the plurality of fiber-optic cable switching units.

* * * * *

UNITED STATES PATENT AND TRADEMARK OFFICE
CERTIFICATE OF CORRECTION

PATENT NO.    : 6,538,231 B2
DATED         : March 25, 2003
INVENTOR(S)   : Norio Karube et al.

It is certified that error appears in the above-identified patent and that said Letters Patent is hereby corrected as shown below:

<u>Column 8,</u>
Line 51, change "Hi 1" to -- H11 --.

Signed and Sealed this

Twelfth Day of August, 2003

JAMES E. ROGAN
*Director of the United States Patent and Trademark Office*